Patented Nov. 29, 1927.

1,650,709

UNITED STATES PATENT OFFICE.

WILLIAM HENRY GRAVEMAN, OF KENILWORTH, NEW JERSEY, ASSIGNOR TO KAR-BEN-CAST MANUFACTURING COMPANY, INC., OF NEW YORK, N. Y., A CORPORATION OF NEW YORK.

METHOD OF MAKING SHINGLES AND SIMILAR BUILDING ARTICLES.

No Drawing. Application filed July 31, 1926. Serial No. 126,342.

This invention relates to an improved method for making building articles and while it is adapted for manufacturing various articles, this specification, for purposes of brevity and clearness will be limited to the description of the manufacture of shingles.

The invention relates to the manufacture of shingles made of bituminous material, such as set forth in my Patent No. 1,549,867, issued August 18, 1926, and relates particularly to the affixing of a mineral in the form of flakes or a sheet and so baking and pressing the articles as to cause the parts to be fused and the whole article made integral.

The shingle is made of a mixture of materials that will lend themselves to the process and I prefer to use as a base a bituminous material such as asphalt, coal tar, pitch, and the like, this being pulverized and then mixed with a fine mineral aggregate such as sand, or ground ashes or ground slag.

This mixture is then pressed into compact form usually in a mold and when it is pressed it is supplied with the glass. This is usually done by sprinkling the glass in the bottom of a mold and then placing the material over it. In the case of a shingle, only one half, the half to be exposed, is thus supplied with glass.

The material is subjected to heavy pressure to make it compact so that all particles are in close contact and the mixture is then heated to say 100 degrees centigrade.

The material is then subjected to more pressure to a higher temperature in the presence of a minimum amount of air to prevent combustion. This step is one of slow baking, the temperature being about 450 degrees centigrade to carbonize the material of the shingle and the temperature is slowly raised to say 700 degrees to 1100 degrees centigrade. This last temperature hardens and strengthens the material.

During these high temperature treatments the glass is softened and under the pressure it is pressed into the face of the shingle to form a smooth surface. The soft glass becomes about red-hot and fuses with the material in close contact with it so that the glass is actually part of the article and even resists removal under attempts to pick it out.

This step of applying the glass adds nothing to the cost of the shingle except the cost of the glass which is negligible especially when broken or powdered glass is used.

It will be evident that in making tile or articles for more ornamental use than shingles the glass, either broken or cut out in designs such as leaves, scrolls or conventional forms, can be affixed to the face of the article and is an irremovable permanent part of the face and overcomes the necessity of using adhesives or binders to apply it.

I claim:

1. The method of producing shingles and similar articles which comprises the mixing of material pliable when hot, placing flaked mineral on one face of said article, and then pressing and baking the article to cause said flakes to be permanently embedded therein.

2. The method of producing shingles and similar articles which comprises the mixing of pulverized slag or other mineral aggregate, pressing and baking said article with a flaked material on one face, the flaked material being subject to fusing with the article at the baking temperature whereby the flakes are embedded and also fused to the article.

3. The method of producing shingles and similar articles which comprises the mixing of the material to form a plastic mass, and then pressing and baking the mass into the desired shape with broken glass on the surface, the baking temperature being high enough to soften the glass and fuse it to the baked product.

4. The method of producing shingles and similar articles which comprises the mixing of bituminous material and fine mineral aggregate, supplying fine glass particles to one face of the material and then pressing and baking the materials so that the material of the shingle is carbonized and the glass is softened and fused therewith and then allowing the shingle to cool.

5. The method of producing shingles and similar articles which comprises the mixing of bituminous material and fine mineral aggregate, supplying metal particles to one face of the material and then pressing and baking the materials so that the material of the shingle is carbonized and the metal is softened and fused therewith and then allowing the shingle to cool.

In testimony whereof I affix my signature.

WILLIAM HENRY GRAVEMAN.